US008436871B2

(12) United States Patent
 Alberte

(10) Patent No.: US 8,436,871 B2
(45) Date of Patent: May 7, 2013

(54) SPACE EFFICENT SORTABLE TABLE

(75) Inventor: Robert Joseph Alberte, Oconomowoc, WI (US)

(73) Assignee: General Electric Company, Schenectady, NY (US)

( * ) Notice: Subject to any disclaimer, the term of this patent is extended or adjusted under 35 U.S.C. 154(b) by 1045 days.

(21) Appl. No.: 12/105,613

(22) Filed: Apr. 18, 2008

(65) Prior Publication Data

US 2009/0262068 A1 Oct. 22, 2009

(51) Int. Cl.
  *G09G 5/00* (2006.01)
  *G06F 17/00* (2006.01)
  *G06F 3/048* (2006.01)
(52) U.S. Cl.
  USPC ........... 345/619; 345/676; 715/212; 715/213; 715/217; 715/220; 715/227; 715/243; 715/244; 715/245; 715/764; 715/765
(58) Field of Classification Search .................. 345/619, 345/676; 715/212–220, 227–233, 243–253, 715/700, 764, 765
 See application file for complete search history.

(56) References Cited

U.S. PATENT DOCUMENTS

| | | | |
|---|---|---|---|
| 5,390,296 A * | 2/1995 | Crandall et al. | 715/835 |
| 6,626,959 B1 * | 9/2003 | Moise et al. | 715/210 |
| 7,370,047 B2 | 5/2008 | Gorman | |
| 7,424,668 B2 | 9/2008 | DeSpain | |
| 7,461,077 B1 | 12/2008 | Greenwood | |
| 7,480,675 B2 | 1/2009 | Folting et al. | |
| 2007/0136683 A1 * | 6/2007 | Heidari et al. | 715/792 |
| 2008/0195422 A1 * | 8/2008 | Nessinger et al. | 705/3 |

* cited by examiner

*Primary Examiner* — Ke Xiao
*Assistant Examiner* — Andrew Shin
(74) *Attorney, Agent, or Firm* — Andrus Sceales Starke & Sawall LLP

(57) ABSTRACT

A sortable and space efficient graphical user interface and a system for the efficient display of sortable data are disclosed herein. The graphical user interface may include at least one column, at least one row and a data cell defined by the intersection of at least one column and at least one row. First and second data may be displayed in the data cell. A first header is associated with the first column and identifies the first data. A second header is associated with the first column and identifies the second data. In the system for displaying sortable data, a graphical user interface is displayed upon a graphical display. A table is displayed as at least a portion of the graphical user interface, the table having a column with a plurality of rows, each row displaying first and second data and a first header associated with a first data and a second header associated with the second data.

16 Claims, 3 Drawing Sheets

SPACE EFFICENT SORTABLE TABLE

FIELD OF THE DISCLOSURE

The present disclosure relates to the field of graphical information displays. More particularly, the present disclosure relates to the creation of a space efficient sortable table and a system for implementing such.

BACKGROUND

Graphical user interfaces (GUI) displayed on a monitor of a computer workstation have proven effective as a means of both conveying information and facilitating user input device use by one or more users to enter and/or modify the data displayed in the GUI. A GUI that presents data in a tabular form provides quick access to a variety of interrelated data values as identified by the columns and rows of the table.

One advantage of a tabular presentation of data on a GUI is that often the GUI is configured such that the data values displayed on the table may be sorted according to one or more of the data types selected by the user.

In one embodiment each data type is given its own column with a column header identifying the data value. This embodiment most closely replicates that of a standard or paper table configured in the GUI.

A drawback of this embodiment is that listing each data type in a separate column with a separate header can increase the width of the table and thus may require either more GUI space or alternatively, requires a user to scroll the table horizontally in order to view all of the data values. The alternative embodiment aims to solve this problem by combining the display of a plurality of data types into a single multi-valued column.

Under typical tabular GUI formats, two types of tables and sorting user interfaces may be implemented. In the first embodiment, each data value is assigned to a particular column with a single header identifying the data value in each column. In this embodiment, each additional data type requires an additional column and adds to the overall table width. These tables may become too wide to be displayed in a limited display area. In the second embodiment, few headers or none at all are identified for the table and multiple types of data values may be displayed in each column of the table. In these embodiments, the user must typically use a drop down menu to select the data type by which it is desired that the table be sorted.

BRIEF DISCLOSURE

A space efficient sortable table and a system for implementing thereof are disclosed in further detail herein. An embodiment of the space efficient sortable table may include at least one column and at least one row defining a first data cell by the intersection of the first column in the first row. First and second data types may be displayed in the first data cell. First and second headers associated with the first column may also be included wherein the first header identifies the first data type and the second header identifies the second data type.

An embodiment of the system as disclosed herein may include a graphical display, a graphical user interface, and a user input device. The graphical user interface may be displayed on the graphical display. The graphical user interface may present data in a table with a plurality of headers identifying the data while the user input device is operable to select at least one of the plurality of headers.

DETAILED DISCLOSURE

Figure 1:
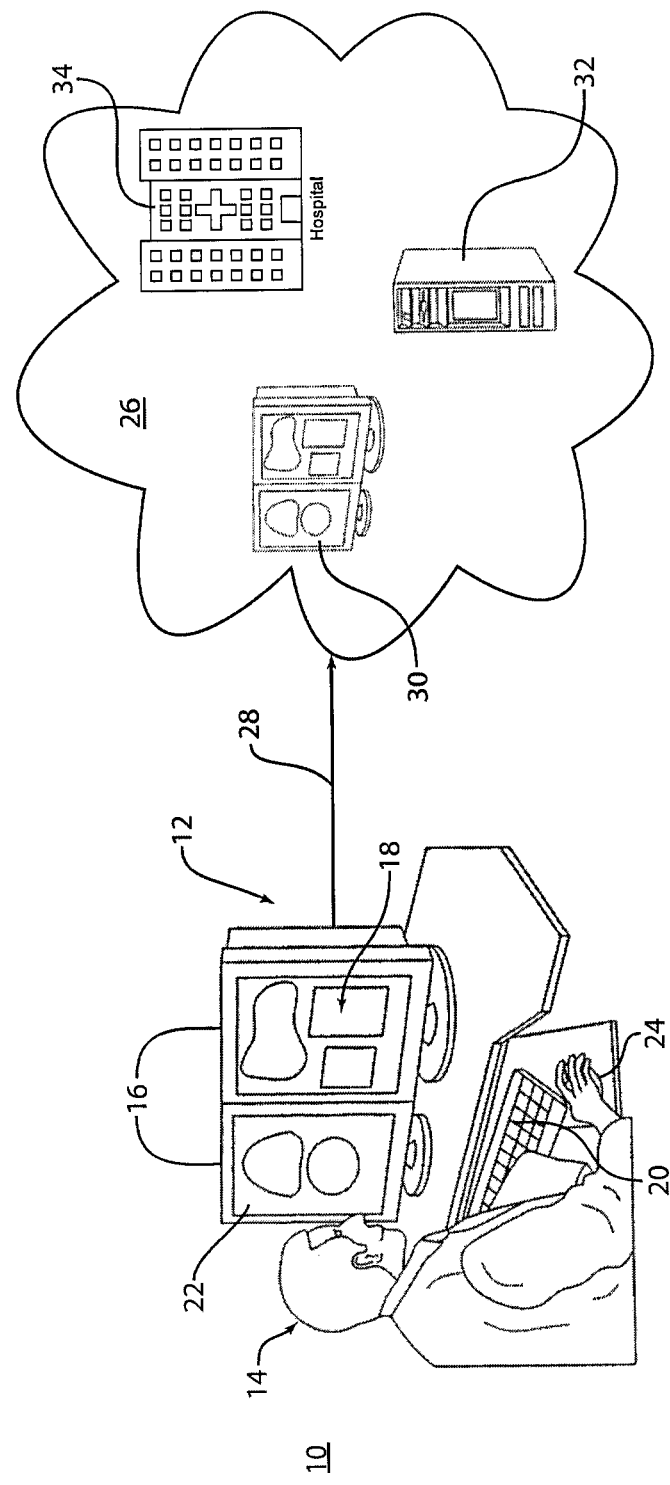
FIG. 1 depicts a system for displaying a space efficient sortable table.

FIG. 1 depicts a system 10 for using a space efficient sortable table. In the system 10, a computer workstation 12 may be operated by a user 14. It should be noted that for exemplary purposes the following disclosure will utilize embodiments describing and/or related to the medical field; however, these descriptions are merely for exemplary purposes and are not intended to be limiting on the scope of the applications within which the embodiment disclosed may be used. In the embodiment described, the user 14 may therefore be a clinician 14.

The computer workstation 12 may include a graphical display 16. The graphical display 16 of the computer workstation 12 may present a graphical user interface (GUI) 18 that serves one or more functions of the computer workstation 12, namely, that of presenting graphical data values and/or facilitating a user input device such that a clinician 14 may enter, modify, or interact with data values displayed by the GUI 18 of the computer workstation 12.

The user input device may include, but is not herein limited to, a keyboard 20, a touch screen 22, or mouse 24. In an embodiment utilizing a touch screen 22, the touch sensitive regions of the display 16 may coincide with objects of the GUI 18 such that the clinician 14 selects and/or enters data values by touching the relevant object of the GUI 18.

The computer workstation 12 may be connected to a hospital information network 26 by a data connection 28. The data connection 28 may be a wired or wireless connection extending from the computer workstation 12 to the hospital information network 26. Alternatively, the computer workstation 12 may be one of many computer workstations connected by the data connection 28 to the hospital information network 26. The hospital information network 26 may comprise a variety of data processing and/or storage locations, including, but not limited to, other computer workstations 30, servers 32 or other medical facilities 34. The other medical facilities may include other hospitals or clinics within the service network of a healthcare provider, other medical facilities operated by third parties, or medical research institutions. The hospital information network 26 may also further include additional wired and/or wireless connections including connections utilizing the internet or a hospital's intranet to connect some or all of the other workstations 30, servers 32, and other medical facilities 34.

Figure 2:
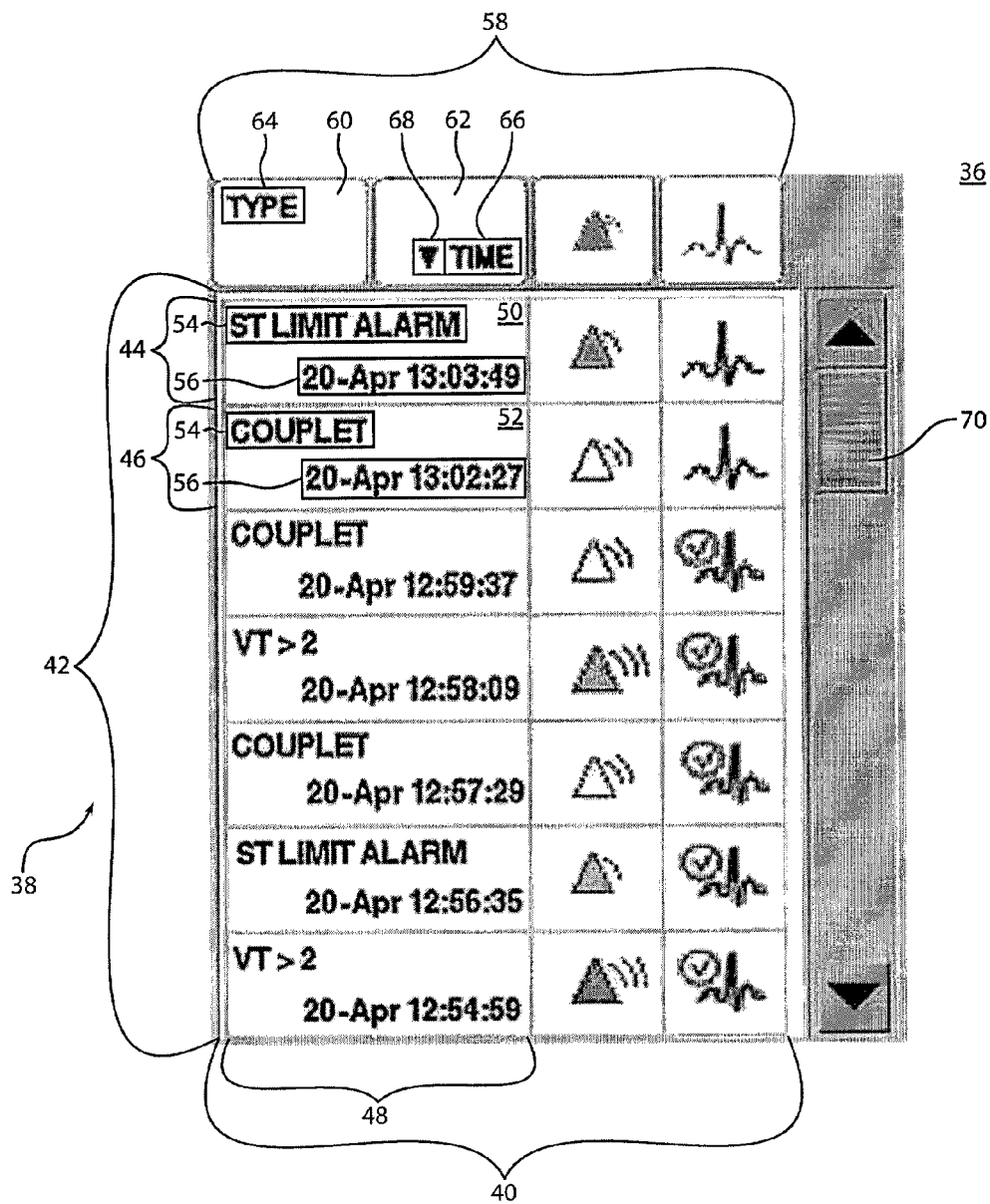
FIG. 2 depicts an embodiment of a graphical user interface incorporating a space efficient sortable table.

FIG. 2 depicts an embodiment of a GUI 36 utilized in the system described above. The GUI 36 includes a table 38 comprising a plurality of columns 40, including a first column 48 and a plurality of rows 42, including a first row 44 and a second row 46. The intersection of the first column 48 with the first row 44 defines a data cell 50 and the intersection of the first column 48 and the second row 46 defines a data cell 52.

Data cells 50 and 52 each include a first data value 54 and a second data value 56. As depicted in the embodiment in FIG. 2, the table 38 presents data values related to the generation of alarms by a patient monitoring system. The patient monitoring system may include a plurality of predefined alarm conditions such that different types of alarms are generated based upon sensed patient physiological conditions. The first data value 54 is an indication of the type of detected alarm and the second data value 56 is the time and date that the alarm was initiated. However, it is understood that in an alternative embodiment of the table 38, the first data value 54 and the second value 56 may be any type of physiological or other clinical data as is to be displayed by the table 38 and should not be herein limited to patient monitoring system alarms, or even to patient physiological data.

The graphical user interface 36 includes a plurality of headings 58 including a first heading 60 and second heading 62. For most columns of the plurality of columns 40, a single heading from the plurality of headings 58 is associated with each of the columns from the plurality of columns 40. However, in the embodiment illustrated, the first heading 60 and the second heading 62 are both associated with the first column 48. The first heading 60 includes a first column label that is associated with the first data value 54. The first column label 64 of the first heading 60 identifies the data type presented by the first data value 54. Similarly, the second column label 66 found on the second heading 62 is associated with the second data value 56. The second column label 66 identifies the data type of the second data value 56.

In the embodiment illustrated, the first column label 64 is placed in a physical orientation such as to further indicate its association with the first data value 54. In FIG. 2, this is exemplified by the fact that the orientation of the first column label 64 matches the vertical and horizontal orientation of the first data value 54. In other words, the first column label 64 appears in the upper left hand corner of the first heading 60, while the first data value 54 appears in the upper left hand corner of the data cell 50. Similarly, the second column label 66 spatially indicates its association with the second data value 56 as the second column label 66 is located in the lower right hand corner of the second heading 62 while the second data value 56 similarly is located at the lower right hand corner of data cells 50 and 52.

In the embodiment disclosed herein, the plurality of headings 58 are objects within the GUI 36 that are a part of the user interface such as to facilitate a clinician's interaction with the GUI 36 using a user input device. In such an embodiment, a selection of one of the plurality of headings 58 by the clinician 14 will sort the plurality of rows 42 in the table 38 according to the data type associated with the selected heading of the plurality of headings 58. At the time of such a selection, a status indicator 68 appears in relation to the column label of the selected heading. The status indicator 68 may comprise an arrow that identifies the direction of the order in which the plurality of rows 42 have been sorted according to the associated data type. Alternatively, the status indicator may be a boldening of the column label and the associated data values of the selected data type.

As depicted in FIG. 2, the second heading 62, associated with the second column label 66, has been selected and therefore a status indicator 68 appears in relation to the second column label 66. The status indicator 68 identifies that the plurality of rows 42 have been sorted in an order from top to bottom according to the value of the second data value 56 (time the event was recorded). In the embodiment shown, a second selection of the second heading 62 would re-sort the plurality of rows 42 from bottom to top, and the status indicator 68 would change to an upward facing arrow to reflect this new sorting.

The GUI 36 also includes a vertical scroll bar 70 such that every row of the plurality of rows 42 need not be shown in the GUI at a single time, but rather may be scrolled by the clinician to view the rows at the bottom of the sorting.

It should be noted that by combining the first data value 54 and the second data value 56 into the first column 48, the width of the table 38, and therefore, the width of the GUI 36 are reduced as the first column 48 is of a width narrower then that as would be normally required to display the first data value 54 and the second data value 56 in two separate columns. Thus, the GUI 36 is a spatially efficient means of displaying the table 38. At the same time the plurality of headings 58 are elongated in the vertical direction such that the first column label 64 and the second column label 66 may be placed in an indicative manner within the first heading 60 and the second heading 62 such as to further build the association between the first heading 60, first column label 64, and first data value 54, and similarly the second heading 62, second column label 66, and the second data value 56.

An additional benefit of the vertically elongated plurality of headings 58 is that the headings comprise an increased area of the GUI. The spatially larger headings are easier for a clinician to select, in conjunction with the user input device, the proper heading to sort the rows 42 of the table 38. This is particularly applicable to embodiments wherein the GUI 36 is displayed on a display 16 that incorporates a touch screen 22. The clinician 14 must interact with the touch screen 22 by physically touching the object or heading within the GUI 36 that the clinician wants to select. The larger headings facilitate the clinician's ability to quickly and accurately make a selection. This makes it easier for the clinician to use the GUI 36 in order to access the medical data displayed on the table 38.

Figure 3:
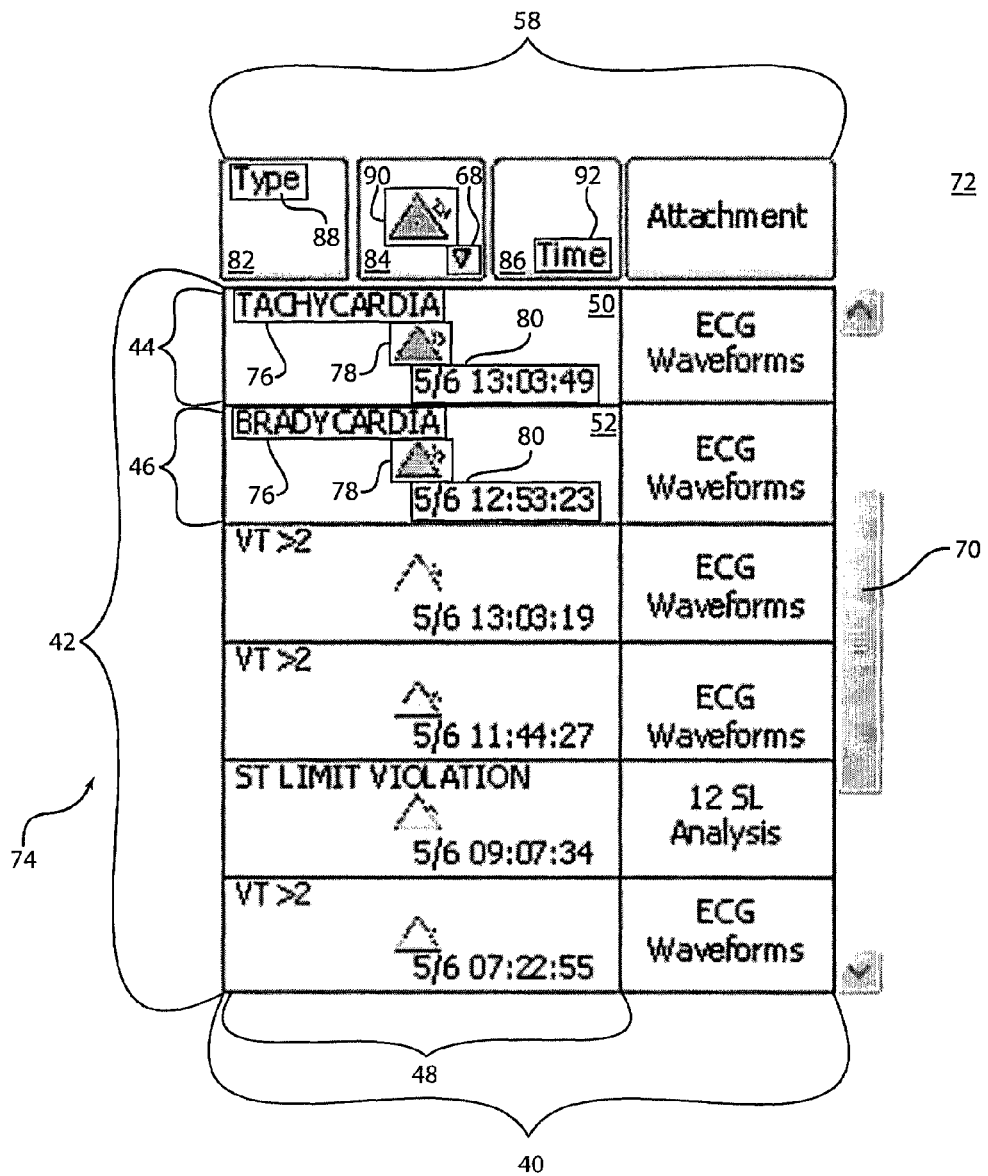
FIG. 3 depicts an alternative embodiment of a graphical user interface incorporating a space efficient sortable table.

FIG. 3 depicts an alterative embodiment of a GUI 72. As depicted in FIG. 3, like elements from FIG. 2 incorporate the same identifying numbers. GUI 72 incorporates a table 74 that presents various medical data values in a plurality of columns 40 and a plurality of rows 42. The plurality of columns includes a first column 48 and the plurality of rows 42 includes a first row 44 and a second row 46. The intersection of the first column 48 and the first row 44 defines a data cell 50 and the intersection of the first column 48 and the second row 46 defines a data cell 52. There is also a plurality of headers 58 wherein at least one of the plurality of headers is associated with each of the plurality of columns 40.

In the embodiment depicted in FIG. 3, three headers 82, 84, and 86 of the plurality of headers 58 are associated with the first column 48. Data cell 50 and data cell 52 each include a first data value 76; second data value 78, and a third data value 80. First data value 76, second data value 78, and third data value 80 all represent different medical data types that may be presented within the table 74. In the illustrated embodiment, the table 74 is a table reporting a history of alarm events from a patient monitoring system. In such embodiment, first data value 76 represents an indication of alarm type, second data value 78 represents an indication of alarm severity, and third data value 80 represents an indication of the onset of the alarm occurrence.

The data types of the first data 76, second data value 78, and third data value 80 are identified by first label 88, second label 90, and third label 92 respectively. The first label 88 resides in the first header 82. The second label 90 resides in the second header 84. The third label 92 resides in the third header 86. The first header 82, second header 84, and third header 86 are all associated with the first column 48 and the labels of each of the headers identifies one of the data types presented in data cell 50 and data cell 52. As with the GUI 36, shown in FIG. 2, in GUI 72, the first, second, and third labels (88, 90, 92) are oriented within their respective header (82, 84, 86) in an orientation that helps to further establish the association between each of the first, second, and third labels (88, 90, 92) and each of the first, second, and third data (76, 78, 80).

GUI 72 is an embodiment where further spatial efficiency is obtained by condensing three columns worth of data values into a single column with headers that easily identify the data types found in the first column 48 as well as allow for the selection of any of the headers in order to sort the plurality of rows 42 in the table 74 by the data type of the selected header. Thus GUI 72 depicts an embodiment that comprises more than two headers and data types associated with the first column 48 of the table 74. Embodiments as disclosed herein may present the advantages of providing greater efficiency of display space on a graphical display 16 or within a GUI 18. The efficient use of space may allow for the presentation of a greater number of data values to a clinician at a single time, while still providing the benefits of allowing the clinician to sort the data values in the table by each of the data types presented. The increased size of the headers in the vertical dimension also facilitates the use of the headers as GUI objects such that the clinician may interact with the GUI with a user input device.

Some embodiments of the GUI and system as disclosed herein may be implemented solely through the use of a computer, such as through the execution of computer readable code by one or more microprocessors to cause embodiments of the GUI to be displayed as described on a graphical display. In some such embodiment, the technical effect of the system and GUI as disclosed herein is that of proving more efficiently using the defined area of a graphical display or GUI. Other embodiments may present the technical effect of providing a user with an improved user interface for manipulating the data values presented in a table.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent elements with insubstantial differences form the literal languages of the claims.

What is claimed is:

1. A graphical user interface (GUI) for the display and sorting of data, the graphical user interface comprising:
    a plurality of columns, including a first column;
    a plurality of rows, including a first row;
    a first data cell defined by the intersection of the first column and the first row;
    a first data value of a first data type displayed in the first data cell at a first position;
    a second data value of a second data type displayed in the first data cell at a second position, wherein the first and second positions are different;
    a first header associated with the first column and including a first header label that identifies the first data type, the first header label located within the first header at a position corresponding to the first position of the first data value within the first data cell; and
    a second header associated with the first column and including a second header label that identifies the second data type, the second header label located within the second header at a position corresponding to the second position of the second data value within the first data cell wherein the first position is vertically separated from the second position within the first data cell and at least within a portion of the first data value and a portion of the second data value overlap in a horizontal direction.

2. The graphical user interface of claim 1, further comprising:
    a second row;
    a second data cell defined by the intersection of the first column and the second row, the second data cell displaying a second data value of the first data type and a second data value of the second data type.

3. The graphical user interface of claim 2, wherein the first header is a GUI object and a selection of the first header by a user sorts the first row and the second row according to the first data type.

4. The graphical user interface of claim 3 wherein a second selection of the first header by the user sorts the first row and the second row in a reversed order according to the first data type.

5. The graphical user interface of claim 4 wherein the first header is selected by activating a touch-sensitive region of the GUI that is associated with the first header.

6. The graphical user interface of claim 3, wherein the second header is a GUI object and a selection of the second header by a user sorts the first row and the second row according to the second data type.

7. The graphical user interface of claim 1, wherein a size of the first data value in the horizontal direction is greater than a size of the first header in the horizontal direction.

8. The graphical user interface of claim 1,
    wherein a horizontal size of the first data value within the first data cell is greater than a horizontal size of the first header associated with the first column.

9. The graphical user interface of claim 1, wherein the first position is left justified at a top of the first data cell and the second position is right justified at a bottom of the first data cell.

10. A system for displaying sortable data, the system comprising:
    a graphical display;
    a graphical user interface display upon the graphical display;
    a table displayed as at least a portion of the graphical user interface, the table including a column with a plurality of rows defining a plurality of cells, each row displaying a first data value of a first data type at a first location within each cell and second data value of a second data type at a second location within each cell wherein the first location is vertically spaced apart from the second location within each cell and the first location and second location at least partially overlap in the horizontal direction within each cell;
    first header displayed as at least a portion of the graphical user interface and associated with the column, the first header presents a first label that identifies the first data type, the first label is located within the first header at a position that corresponds to the first location of the first data value within each cell;
    a second header displayed as at least a portion of the graphical user interface and associated with the column, the second header presents a second label that identifies the second data type, the second label is located within the second header at a position that corresponds to the second location of the second data value within each cell; and
    a user input device operable to receive a selection of at least one of the first and second headers;

wherein upon the receipt of the selection of the first header, the plurality of rows in the column are sorted according to the first data value in each row, and upon the receipt of the selection of the second header, the plurality of rows in the column are sorted according to the second data value in each row.

11. The system of claim 10 wherein the user input device is a touch-sensitive screen of the graphical display.

12. The system of claim 11, wherein the system is a medical information system and the first and second data values are first and second medical data values, the system comprising:
   at least one remotely located data storage device comprising the first and second medical data values; and
   a hospital information network connecting the graphical display with the at least one remotely located data storage device.

13. The system of claim 10, wherein the first label within the first header matches a horizontal and a vertical orientation of the first data value within each cell and the second label within the second header matches a horizontal and a vertical orientation of the second data value within each cell.

14. The system of claim 10, wherein the table further comprises a third data value of a third data type displayed in each of the plurality of rows and a header associated with the third data type.

15. The system of claim 10, wherein, upon receipt of the selection of the first header, an indicator appears in the first header indicating the order in which the rows are sorted, and, upon receipt of the selection of the second header, the indicator appears in the second header indicating the order in which the rows are sorted.

16. A graphical user interface (GUI) for the display and sorting of data, the graphical user interface comprising:
   a plurality of columns, including a first column;
   a plurality of rows, including a first row;
   a first data cell defined by the intersection of the first column and the first row;
   a first data value of a first data type displayed in the first data cell at a first position;
   a second data value of a second data type displayed in the first data cell at a second position, wherein the first and second positions are different;
   a first header associated with the first column and including a first header label that identifies the first data type, the first header label located within the first header at a position corresponding to the first position of the first data value within the first data cell; and
   a second header associated with the first column and including a second header label that identifies the second data type, the second header label located within the second header at a position corresponding to the second position of the second data value within the first data cell
   wherein the first position is left justified at a top of the first data cell and the second position is right justified at a bottom of the first data cell.

* * * * *